United States Patent
Okamoto et al.

(10) Patent No.: US 10,131,828 B2
(45) Date of Patent: *Nov. 20, 2018

(54) WORKING FLUID FOR HEAT CYCLE, COMPOSITION FOR HEAT CYCLE SYSTEM, AND HEAT CYCLE SYSTEM

(71) Applicant: Asahi Glass Company, Limited, Chiyoda-ku (JP)

(72) Inventors: Hidekazu Okamoto, Chiyoda-ku (JP); Masato Fukushima, Chiyoda-ku (JP); Satoshi Kawaguchi, Chiyoda-ku (JP); Yoshinobu Kadowaki, Chiyoda-ku (JP); Tetsuo Otsuka, Chiyoda-ku (JP); Katsuya Ueno, Chiyoda-ku (JP); Kazuyoshi Kurashima, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/232,167

(22) Filed: Aug. 9, 2016

(65) Prior Publication Data

US 2016/0347979 A1    Dec. 1, 2016

Related U.S. Application Data

(63) Continuation of application No. PCT/JP2015/054661, filed on Feb. 19, 2015.

(30) Foreign Application Priority Data

Feb. 28, 2014    (JP) ................. 2014-038614

(51) Int. Cl.
   *C09K 5/04*    (2006.01)
   *F24F 1/02*    (2011.01)

(52) U.S. Cl.
   CPC ........... *C09K 5/045* (2013.01); *F24F 1/022* (2013.01); *C09K 2205/122* (2013.01); *C09K 2205/126* (2013.01); *C09K 2205/22* (2013.01)

(58) Field of Classification Search
   CPC ............ C09K 5/045; C09K 2205/126; C09K 2205/22
   See application file for complete search history.

(56) References Cited

U.S. PATENT DOCUMENTS

| | | | |
|---|---|---|---|
| 2009/0143604 A1 | 6/2009 | Nappa et al. | |
| 2014/0070132 A1 | 3/2014 | Fukushima | |

FOREIGN PATENT DOCUMENTS

| | | |
|---|---|---|
| JP | 4-110388 | 4/1992 |
| JP | 2006-512426 | 4/2006 |

(Continued)

OTHER PUBLICATIONS

International Search Report dated Apr. 7, 2015 in PCT/JP2015/054661, filed Feb. 19, 2015.

(Continued)

*Primary Examiner* — John R Hardee
(74) *Attorney, Agent, or Firm* — Oblon, McClelland, Maier & Neustadt, L.L.P.

(57) ABSTRACT

To provide a working fluid for heat cycle which has a small temperature glide, a sufficiently low discharge temperature, high durability and less influence over global warming, and with which a heat cycle system excellent in the system maintenance properties and the cycle performance (capacity) is achieved, a composition for a heat cycle system, and a heat cycle system. A working fluid for heat cycle, which contains trifluoroethylene and difluoromethane, wherein the proportion of the total amount of trifluoroethylene and difluoromethane based on the entire amount of the working fluid for heat cycle is higher than 90 mass % and at most 100 mass %, and the mass ratio represented by trifluoroethylene/

(Continued)

difluoromethane in the working fluid for heat cycle is from 41/59 to 59/41, a composition for a heat cycle system, and a heat cycle system employing the composition.

10 Claims, 1 Drawing Sheet

(56) References Cited

FOREIGN PATENT DOCUMENTS

WO WO 2010/042781 A2 4/2010
WO WO 2012/157764 A1 11/2012

OTHER PUBLICATIONS

The Japan Refrigeration and Air Conditioning Industry Association. "Regarding the Fluorocarbon Labelling System" retrieved from https://www.jraia.or.jp/labeling/index.html and https://www.jraia.or.jp/labeling/index4.html on Jun. 19, 2018(w/ English translation).
The Japan Refrigeration and Air Conditioning Industry Association. "Profile of the Japan Refrigeration and Air Conditioning Industry Association", issued in Sep. 2012, and retrieved from https://www.jraia.or.jp/outline/pdf/Profil_jraia.pdf (English translation included).
JIS Z 7161 (2015) (w/ partial English translation).

WORKING FLUID FOR HEAT CYCLE, COMPOSITION FOR HEAT CYCLE SYSTEM, AND HEAT CYCLE SYSTEM

This application is a continuation of PCT Application No. PCT/JP2015/054661, filed on Feb. 19, 2015, which is based upon and claims the benefit of priority from Japanese Patent Application No. 2014-038614 filed on Feb. 28, 2014. The contents of those applications are incorporated herein by reference in their entireties.

TECHNICAL FIELD

The present invention related to a working fluid for heat cycle containing trifluoroethylene and difluoromethane, a composition for a heat cycle system comprising the working fluid, and a heat cycle system.

BACKGROUND ART

Heretofore, as a working fluid such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present. In this specification, abbreviated names of halogenated hydrocarbon compounds are described in brackets after the compound names, and the abbreviated names are employed instead of the compound names as the case requires.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used. For example, R410A (a pseudoazeotropic mixture refrigerant of HFC-32 and HFC-125 in a mass ratio of 1:1) is a refrigerant which has been widely used. However, it is pointed out that HFCs may cause global warming. Accordingly, development of a working fluid for heat cycle which has less influence over the ozone layer and has a low global warming potential and which can replace R410A, is an urgent need.

For example, 1,1,1,2-tetrafluoroethane (HFC-134a) used as a refrigerant for an automobile air-conditioning system has a global warming potential so high as 1,430. Further, in an automobile air-conditioning system, the refrigerant is highly likely to leak out to the air e.g. from a connection hose or a bearing.

As a refrigerant which replaces HFC-134a, carbon dioxide and 1,1-difluoroethane (HFC-152a) having a global warming potential of 124 which is low as compared with HFC-134a, have been studied.

However, with carbon dioxide, the equipment pressure tends to be extremely high as compared with HFC-134a, and accordingly there are many problems to be solved in application to all the automobiles. HFC-152a has a combustion range, and has a problem for securing the safety.

As a working fluid for heat cycle, a hydrofluoroolefin (HFO) having a carbon-carbon double bond has been used, which has less influence over the ozone layer and has less influence over global warming, since the carbon-carbon double bond is likely to be decomposed by OH radicals in the air.

As a HFO to be used for the working fluid for heat cycle, for example, Patent Document 1 proposes 3,3,3-trifluoropropene (HFO-1243zf), 1,3,3,3-tetrafluoropropene (HFO-1234ze), 2-fluoropropene (HFO-1261yf), 2,3,3,3-tetrafluoropropene (HFO-1234yf) and 1,1,2-trifluoropropene (HFO-1243yc).

Further, as a HFO used as a working fluid for heat cycle, Patent Document 2 discloses 1,2,3,3,3-pentafluoropropene (HFO-1225ye), trans-1,3,3,3-tetrafluoropropene (HFO-1234ze(E)), cis-1,3,3,3-tetrafluoropropene (HFO-1234ze(Z)) or HFO-1234yf.

As a working fluid for heat cycle having excellent refrigerant performance, a composition comprising trifluoroethylene (HFO-1123) (for example, Patent Document 3) has been known. Patent Document 3 also discloses an attempt to obtain a working fluid comprising HFO-1123 and various HFCs or HFOs in combination for the purpose of increasing the flame retardancy, cycle performance, etc. of the working fluid.

However, HFOs disclosed in Patent Documents 1 and 2 are insufficient in the cycle performance (capacity) and among such HFOs, one having a low proportion of fluorine atoms has combustibility. Further, HFOs disclosed in Patent Document 2 are also insufficient in the cycle performance (capacity).

Further, Patent Document 3 failed to disclose or suggest to obtain a working fluid comprising HFO-1123 and a HFC or another HFO in combination with a view to obtaining a working fluid for heat cycle which is practically useful comprehensively considering the balance of the capacity, the efficiency, the safety and the discharge temperature. For example, HFO-1123 may undergo self-decomposition reaction under high temperature and high pressure conditions, and when a composition containing HFO-1123 is to be practically used, durability of a working fluid for heat cycle containing HFO-1123 should be improved. Further, if a compressor discharge gas temperature (hereinafter sometimes referred to as a discharge temperature) when a working fluid for heat cycle is applied to a refrigerating cycle is high, the heat resistance of a material constituting the compressor, a refrigerant oil usually contained in a composition for a heat cycle system in addition to the working fluid, an organic compound and the like may be impaired.

Accordingly, a working fluid for heat cycle which has a small temperature glide and a sufficiently high cycle performance (capacity) and has less influence over global warming, and which further has a sufficiently low discharge temperature and higher durability, has been desired.

PRIOR ART DOCUMENTS

Patent Documents

Patent Document 1: JP-A-4-110388
Patent Document 2: JP-A-2006-512426
Patent Document 3: WO2012/157764

DISCLOSURE OF INVENTION

Technical Problem

It is an object of the present invention to provide a working fluid for heat cycle which has a small temperature glide, less influence over global warming, a sufficiently low discharge temperature, high durability and high cycle performance (capacity), a composition for a heat cycle system comprising the working fluid, and a heat cycle system employing the composition.

Solution to Problem

The present invention provides the following working fluid for heat cycle, composition for a heat cycle system and heat cycle system.
[1] A working fluid for heat cycle, which contains trifluoroethylene and difluoromethane, wherein the proportion of the total amount of trifluoroethylene and difluoromethane based on the entire amount of the working fluid for heat cycle is higher than 90 mass % and at most 100 mass %, and the mass ratio represented by trifluoroethylene/difluoromethane in the working fluid for heat cycle is from 41/59 to 59/41.
[2] The working fluid for heat cycle according to [1], wherein the mass ratio represented by trifluoroethylene/difluoromethane in the working fluid for heat cycle is from 43/57 to 59/41.
[3] The working fluid for heat cycle according to [1], wherein the mass ratio represented by trifluoroethylene/difluoromethane in the working fluid for heat cycle is from 45/55 to 59/41.
[4] The working fluid for heat cycle according to [1], wherein the mass ratio represented by trifluoroethylene/difluoromethane in the working fluid for heat cycle is from 45/55 to 55/45.
[5] The working fluid for heat cycle according to any one of [1] to [4], wherein the proportion of the total amount of trifluoroethylene and difluoromethane based on the entire amount of the working fluid for heat cycle is higher than 97 mass % and at most 100 mass %.
[6] The composition for a heat cycle system, which comprises the working fluid for heat cycle as defined in any one of [1] to [5] and a refrigerant oil.
[7] A heat cycle system, which employs the composition for a heat cycle system as defined in [6].
[8] The heat cycle system according to [7], which is a refrigerating apparatus, an air-conditioning apparatus, a power generation system, a heat transport apparatus or a secondary cooling machine.
[9] The heat cycle system according to [7], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

The working fluid for heat cycle and the composition for a heat cycle system of the present invention have a low temperature glide, a sufficiently low discharge temperature and high durability. Further, they have less influence over global warming and are excellent in the cycle performance (capacity).

Further, the heat cycle system of the present invention, which employs the working fluid for heat cycle of the present invention, has high durability, has less influence over global warming and is excellent in the cycle performance (capacity) and the energy efficiency.

DESCRIPTION OF EMBODIMENTS

Now, the present invention will be described in detail.
[Working Fluid for Heat Cycle]
The working fluid for heat cycle of the present invention is a working fluid for heat cycle containing HFO-1123 and HFC-32, wherein the proportion of the total amount of HFO-1123 and HFC-32 based on the entire amount of the working fluid for heat cycle is higher than 90 mass % and at most 100 mass %. Further, the mass ratio represented by HFO-1123/HFC-32 in the working fluid for heat cycle is from 41/59 to 59/41.

HFO-1123 used for the working fluid for heat cycle of the present invention is known to undergo chain self-decomposition reaction involving a rapid temperature and pressure increase at high temperature or with an ignition source under high pressure. The working fluid for heat cycle of the present invention is a mixture of HFO-1123 with HFC-32 with a lowered content of HFO-1123, whereby the self-decomposition reaction can be prevented. In a case where the working fluid for heat cycle of the present invention is applied to a heat cycle system, the pressure conditions are usually at a level of 5.0 MPa or lower. Accordingly, by the working fluid for heat cycle comprising HFO-1123 and HFC-32 having no self-decomposition property under a pressure of 5.0 MPa, a working fluid for heat cycle having high durability under conventional temperature conditions under which the working fluid is applied to a heat cycle system, can be obtained.

Further, considering a case where a contingency such as a breakdown of a heat cycle system apparatus arises, by the composition having no self-decomposition property under a pressure of about 7.0 MPa, a working fluid for heat cycle with higher durability can be obtained.

The working fluid for heat cycle of the present invention, even having a composition with self-decomposition property, may be used for a heat cycle system with careful handling depending upon the conditions of use.

The compressor discharge gas temperature (discharge temperature) of the working fluid for heat cycle is the maximum temperature in the refrigerating cycle. The discharge temperature has influence over the heat resistance of the material constituting a compressor, a refrigerant oil which the composition for a heat cycle system usually contains in addition to the working fluid, and a polymer material. Accordingly, the discharge temperature is preferably lower. For example, in order that the working fluid is useful as an alternative to R410A, the discharge temperature should be a temperature which equipment constituting the heat cycle system operated with R410A can withstand, whether it may be lower or higher than the discharge temperature of R410A.

Figure 1:
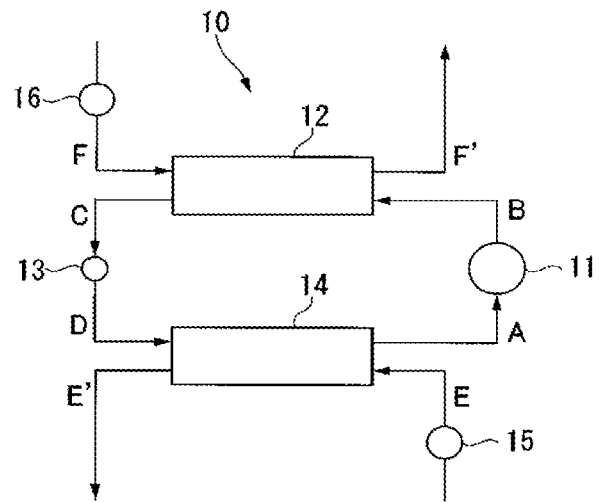
FIG. 1 is a schematic construction view illustrating an example of a refrigerating cycle system.

The discharge temperature may be evaluated, for example, by employing the discharge temperature T when the working fluid of the present invention is applied to a refrigerating cycle system shown in FIG. 1 under temperature conditions such that the average evaporation temperature is 0° C., the average condensing temperature is 40° C., the degree of superheat is 5° C., and the supercooling degree is 5° C. For example, when R410A is applied to a refrigerating cycle system under the above temperature conditions, the discharge temperature $T_{R410A}$ is 73.4° C. The discharge temperature T is preferably such that the difference with $T_{R410A}$ ($\Delta T = T - T_{R410A}$) is at a level of at most 15° C.

Further, the working fluid for heat cycle of the present invention preferably has a global warming potential (100 years) in Intergovernmental Panel on Climate Change (IPCC), Fourth assessment report (2007) of at most 400, more preferably at most 385, from the viewpoint of the influence over global warming.

The global warming potential (100 years) of HFC-32 is 675 by a value in Intergovernmental Panel on Climate Change (IPCC), Fourth assessment report (2007), and the global warming potential (100 years) of HFO-1123 is 0.3 as a value measured in accordance with IPCC, Fourth assessment report. In this specification, unless otherwise specified, the global warming potential (GWP) is a value (100 years) in Intergovernmental Panel on Climate Change (IPCC), Fourth assessment report. Further, GWP of a mixture is represented by a weighted average by the composition mass. For example, GWP of a mixture of HFO-1123 and HFC-32 in a mass ratio of 1:1 may be calculated as (0.3+675)/2=338.

In a case where the working fluid for heat cycle of the present invention contains the after-described optional component in addition to HFO-1123 and HFC-32, GWP of the working fluid for heat cycle may be obtained by weighted average of the GWP of the optional component per unit mass by the masses of the respective components in the composition.

Considering the above-mentioned self-decomposition property, discharge temperature T and GWP, for the working fluid for heat cycle of the present invention, a composition of HFO-1123/HFC-32 of from 41/59 to 59/41 (GWP: 398 to 277) is selected. By the ratio of HFO-1123/HFC-32 being at least 41/59, a working fluid for heat cycle which has a small temperature glide, a sufficiently low discharge temperature T, less influence over global warming and excellent cycle performance (capacity) can be obtained. Further, by the ratio HFO-1123/HFC-32 being at most 59/41, a working fluid for heat cycle which has no self-decomposition property under temperature conditions under which the working fluid is applied to a heat cycle system and which is excellent in the durability can be obtained.

The ratio of HFO-1123/HFC-32 is preferably at least 43/57, more preferably at least 45/55. Within such a range, the discharge temperature T, GWP and the temperature glide can be kept lower. The ratio of HFO-1123/HFC-32 is preferably at most 55/45, and within such a range, an extremely stable working fluid for heat cycle which has no self-decomposition property even under high pressure can be obtained. Accordingly, in the working fluid for heat cycle of the present invention, the ratio of HFO-1123/HFC-32 is preferably from 43/57 to 59/41, more preferably from 45/55 to 59/41, further preferably from 45/55 to 55/45.

HFO-1123 and HFC-32 form a pseudoazeotropic mixture within a range of the mass ratio of the present invention. Accordingly, the working fluid for heat cycle of the present invention has an extremely small temperature glide. The temperature glide is an index to a difference in the composition between in a liquid phase and in a gaseous phase of a mixture as the working fluid. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0.

If the temperature glide is large, for example, the inlet temperature of an evaporator tends to be low, and frosting is likely to occur. Further, in a heat cycle system, the heat exchange efficiency is to be improved by making the working fluid for heat cycle and the heat source fluid such as water or the air flowing in heat exchangers flow in countercurrent flow. Since the temperature difference of the heat source fluid is small in a stable operation state, it is difficult to obtain a heat cycle system with a good energy efficiency with a non-azeotropic mixture with a large temperature glide. Accordingly, in a case where a mixture is used as the working fluid, a working fluid with an appropriate temperature glide is desired.

Further, when a non-azeotropic mixture is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Whereas, the above problems can be avoided with the working fluid for heat cycle of the present invention, which is a pseudoazeotropic mixture.

In the working fluid for heat cycle of the present invention, the proportion of the total amount of HFO-1123 and HFC-32 based on the entire amount of the working fluid for heat cycle is higher than 90 mass % and at most 100 mass %. By the proportion of the total amount of HFO-1123 and HFC-32 being higher than 90 mass %, a working fluid for heat cycle having an extremely small composition change and thereby having a small temperature glide, and being excellent in the balance of the properties such as the discharge temperature and GWP, can be obtained. In the working fluid for heat cycle of the present invention, the proportion of the total amount of HFO-1123 and HFC-32 is preferably higher than 97 mass %, particularly preferably 100 mass %, in view of a small temperature glide and with a view to keeping the balance of properties such as the discharge temperature and GWP.

(Refrigerating Cycle System)

A refrigerating cycle system as an example of the heat cycle system will be described. The refrigerating cycle system is a system wherein in an evaporator, a working fluid for heat cycle removes heat energy from a load fluid to cool the load fluid thereby to accomplish cooling to a lower temperature.

FIG. 1 is a schematic construction view illustrating an example of a refrigerating cycle system of the present invention. A refrigerating cycle system 10 is a system generally comprising a compressor 11 to compress a vapor A of the working fluid for heat cycle to form a high temperature/high pressure vapor B of the working fluid for heat cycle, a condenser 12 to cool and liquefy the vapor B of the working fluid for heat cycle discharged from the compressor 11 to form a low temperature/high pressure working fluid C for heat cycle, an expansion valve 13 to let the working fluid C for heat cycle discharged from the condenser 12 expand to form a low temperature/low pressure working fluid D for heat cycle, an evaporator 14 to heat the working fluid D for heat cycle discharged from the expansion valve 13 to form a high temperature/low pressure vapor A of the working fluid for heat cycle, a pump 15 to supply a load fluid E to the evaporator 14, and a pump 16 to supply a fluid F to the condenser 12.

In the refrigerating cyclic system 10, the following cycle is repeated.

(i) A vapor A of the working fluid for heat cycle discharged from an evaporator 14 is compressed by a compressor 11 to form a high temperature/high pressure vapor B of the working fluid for heat cycle.

(ii) The vapor B of the working fluid for heat cycle discharged from the compressor 11 is cooled and liquefied by a fluid F in a condenser 12 to form a low temperature/high pressure working fluid C for heat cycle. At that time, the fluid F is heated to form a fluid F', which is discharged from the condenser 12.

(iii) The working fluid C for heat cycle discharged from the condenser 12 is expanded in an expansion valve 13 to form a low temperature/low pressure working fluid D for heat cycle.

(iv) The working fluid D for heat cycle discharged from the expansion valve 13 is heated by a load fluid E in an evaporator 14 to form a high temperature/low pressure vapor A of the working fluid for heat cycle. At that time, the load fluid E is cooled and becomes a load fluid E', which is discharged from the evaporator 14.

The refrigerating cycle system 10 is a cycle comprising an adiabatic isentropic change, an isenthalpic change and an isobaric change. The state change of the working fluid for heat cycle, as represented on a pressure-enthalpy chart as shown in FIG. 2, may be represented as a trapezoid having points A, B, C and D as vertexes.

Figure 2:
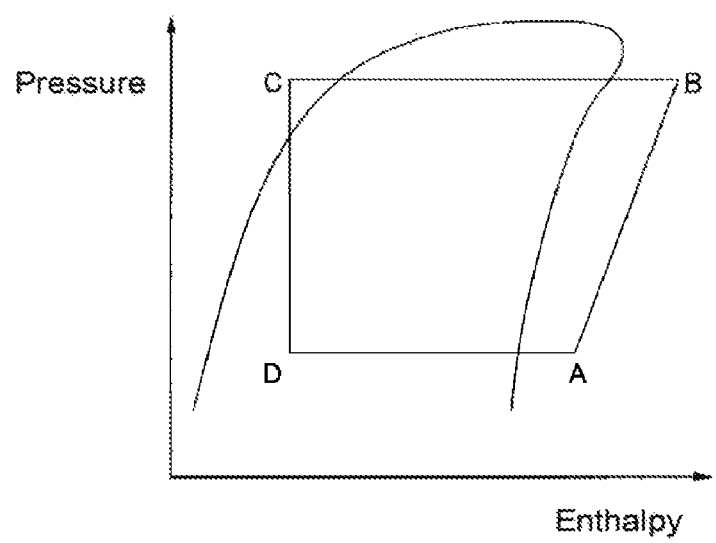
FIG. 2 is a cycle diagram illustrating the state change of a working fluid for heat cycle in a refrigerating cycle system on a pressure-enthalpy chart.

In FIG. 2, the AB process is a process wherein adiabatic compression is carried out by the compressor 11 to change the high temperature/low pressure vapor A of the working fluid for heat cycle to a high temperature/high pressure vapor B of the working fluid for heat cycle. The vapor A of the working fluid for heat cycle in a superheated state is introduced to the compressor 11, and the obtained vapor B of the working fluid for heat cycle is also a vapor in a superheated state. The BC process is a process wherein isobaric cooling is carried out in the condenser 12 to change the high temperature/high pressure vapor B of the working fluid for heat cycle to a low temperature/high pressure working fluid C for heat cycle. The CD process is a process wherein isenthalpic expansion is carried out by the expansion valve 13 to change the low temperature/high pressure working fluid C for heat cycle to a low temperature/low pressure working fluid D for heat cycle. The DA process is a process wherein isobaric heating is carried out in the evaporator 14 to have the low temperature/low pressure working fluid D for heat cycle returned to a high temperature/low pressure vapor A of the working fluid for heat cycle.

Here, cycle performance of the working fluid for heat cycle is evaluated, for example, by the refrigerating capacity (hereinafter referred to as "Q" as the case requires) and the coefficient of performance (hereinafter referred to as "COP" as the case requires) of the working fluid for heat cycle. Q and COP of the working fluid for heat cycle are obtained respectively in accordance with the following formulae (1) and (2) from enthalpies hA, hB, hC and hD in the respective states A (after evaporation, high temperature and low pressure), B (after compression, high temperature and high pressure), C (after condensation, low temperature and high pressure) and D (after expansion, low temperature and low pressure) of the working fluid for heat cycle:

$$Q=hA-hD \tag{1}$$

$$COP=Q/\text{compression work}=(hA-hD)/(hB-hA) \tag{3}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid for heat cycle having a higher Q, the desired performance can be obtained with a smaller amount, whereby the system can be downsized.

(Optional Component)

The working fluid for heat cycle of the present invention may optionally contain a compound commonly used as a working fluid, in addition to HFO-1123 and HFC-32, within a range not to impair the effects of the present invention.

The compound which the working fluid for heat cycle of the present invention may optionally contain in addition to HFO-1123 and HFC-32 (hereinafter referred to as an optional component) may be a HFO other than HFC-1123, a HFC having a carbon-carbon double bond other than HFC-32, a hydrocarbon, a HCFO or a CFO.

In the working fluid for heat cycle of the present invention, the total content of the optional component is less than 10 mass %, preferably less than 3 mass % in the working fluid for heat cycle (100 mass %). If the content of the optional component exceeds 10 mass %, when the working fluid is used for e.g. a refrigerant, if the working fluid leaks out from a heat cycle apparatus, the temperature glide of the working fluid for heat cycle may be large, and in addition, the balance of the discharge temperature and GWP may be lost.

(HFO Other than HFO-1123)

The HFO other than HFO-1123, which the working fluid for heat cycle of the present invention may contain, may, for example, be 1,2-difluoroethylene (HFO-1132), HFO-1261yf, HFO-1243yc, trans-1,2,3,3,3-pentafluoropropene (HFO-1225ye(E)), cis-1,2,3,3,3-pentafluoropropene (HFO-1225ye(Z)), HFO-1234yf, HFO-1234ze(E), HFO-1234ze (Z) or HFO-1243zf. The HFO may be used alone or in combination of two or more.

In a case where the working fluid for heat cycle of the present invention contains a HFO other than HFO-1123, the content is preferably from 1 to 9 mass %, more preferably from 1 to 2 mass % in the working fluid for heat cycle (100 mass %). (HFC other than HFC-32)

A HFC is a component which improves the cycle performance (capacity) of a heat cycle system. The HFC other than HFC-32 which the working fluid for heat cycle of the present invention may contain, may, for example, be HFC-152a, difluoroethane, trifluoroethane, HFC-134a, HFC-125, pentafluoropropane, hexafluoropropane, heptafluoropropane, pentafluorobutane or heptafluorocyclopentane. The HFC may be used alone or in combination of two or more.

The HFC is particularly preferably HFC-134 or HFC-152a, in view of less influence over the ozone layer and less influence over global warming.

In a case where the working fluid for heat cycle of the present invention contains a HFC other than HFC-32, the content is preferably from 1 to 9 mass %, more preferably from 1 to 2 mass % in the working fluid for heat cycle (100 mass %). The content of such a HFC may be controlled depending upon the required properties of the working fluid for heat cycle.

(Hydrocarbon)

The hydrocarbon may, for example, be propane, propylene, cyclopropane, butane, isobutane, pentane or isopentane.

The hydrocarbon may be used alone or in combination of two or more.

In a case where the working fluid for heat cycle of the present invention contains a hydrocarbon, its content is preferably from 1 to 9 mass %, more preferably from 1 to 2 mass % in the working fluid for heat cycle (100 mass %). When the content of the hydrocarbon is at least 1 mass %, the solubility of the refrigerant oil in the working fluid for heat cycle will sufficiently improve. When the content of the hydrocarbon is at most 9 mass %, the hydrocarbon is effective to suppress combustibility of the working fluid for heat cycle.

(HCFO, CFO)

The HCFO may, for example, be a hydrochlorofluoropropene or a hydrochlorofluoroethylene, and particularly preferred is 1-chloro-2,3,3,3-tetrafluoropropene (HCFO-1224yd) or 1-chloro-1,2-difluoroethylene (HCFO-1122) with a view to sufficiently suppressing combustibility of the working fluid for heat cycle without significantly decreasing the cycle performance (capacity) of the heat cycle system.

The HCFO may be used alone or in combination of two or more.

The CFO may, for example, be chlorofluoropropene or chlorofluoroethylene, and is particularly preferably 1,1-dichloro-2,3,3,3-tetrafluoropropene (CFO-1214ya) or 1,2-dichloro-1,2-difluoroethylene (CFO-1112) with a view to sufficiently suppressing combustibility of the working fluid for heat cycle without significantly decreasing the cycle performance (capacity) of the heat cycle system.

In a case where the working fluid for heat cycle of the present invention contains a HCFO and/or a CFO, the total content is preferably from 1 to 9 mass % in the working fluid for heat cycle (100 mass %). Chlorine atoms have an effect to suppress combustibility, and when the content of the HCFO and the CFO is within such a range, combustibility of the working fluid for heat cycle can be sufficiently suppressed without significantly decreasing the cycle performance (capacity) of the heat cycle system. Further, they are components which improve the solubility of the refrigerant oil in the working fluid for heat cycle. As the HCFO and the CFO, preferred is a HCFO which has less influence over the ozone layer and which has less influence over global warming.

[Application to Heat Cycle System]

When the working fluid for heat cycle of the present invention is applied to a heat cycle system, it may be used as a composition for a heat cycle system of the present invention usually as mixed with a refrigerant oil. Further, the composition for a heat cycle system of the present invention may further contain a known additive such as a stabilizer or a leak detecting substance in addition to the above components.

(Refrigerant Oil)

As a refrigerant oil, a known refrigerant oil used for a composition for a heat cycle system may be used.

The refrigerant oil may, for example, be an oxygen-containing synthetic oil (such as an ester refrigerant oil, an ether refrigerant oil or a polyglycol oil), a fluorinated refrigerant oil, a mineral oil or a hydrocarbon synthetic oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Specifically, ditridecyl glutarate, di(2-ethylhexyl) adipate, diisodecyl adipate, ditridecyl adipate or di(3-ethylhexyl) sebacate may, for example, be mentioned.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerin, sorbitol, sorbitan or a sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may, for example, be a polyglycol (such as polyalkylene glycol, its ether compound or a modified compound thereof) obtained by homopolymerizing or copolymerizing a diol (as described above), a polyol (as described above), or one having a polyglycol added to a polyol.

The polyalkylene glycol may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol may contain single oxyalkylene units or two or more types of oxyalkylene units. It is preferred that at least oxypropylene units are contained in one molecule.

The ether refrigerant oil may be a polyvinyl ether.

The polyvinyl ether may be one obtained by polymerizing a vinyl ether monomer, one obtained by copolymerizing a vinyl ether monomer and a hydrocarbon monomer having an olefinic double bond, or a copolymer of a polyvinyl ether and an alkylene glycol or a polyalkylene glycol or a monoether thereof.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or an alkyl-substituted styrene. The hydrocarbon monomer having an olefinic double bond may be used alone or in combination of two or more.

The polyvinyl ether copolymer may be either of a block copolymer and a random copolymer.

The polyvinyl ether may be used alone or in combination of two or more.

The polyglycol oil is preferably a polyalkylene glycol oil based on a polyalkylene glycol. The polyalkylene glycol may be a hydroxy group-initiated polyalkylene glycol such as a compound having a $C_{2-4}$ alkylene oxide added to a monohydric or polyhydric alcohol (such as methanol, butanol, pentaerythritol or glycerol). Further, it may be one having the terminal of the hydroxy group-initiated polyalkylene glycol capped with an alkyl group such as a methyl group.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be poly-α-olefin, an alkylbenzene or an alkylnaphthalene.

The refrigerant oil may be used alone or in combination of two or more.

The refrigerant oil is preferably a polyol ester oil and/or a polyglycol oil in view of the compatibility with the working fluid for heat cycle, and is particularly preferably a polyalkylene glycol oil with a view to obtaining a remarkable antioxidant effect by the after-mentioned stabilizer.

In the composition for a heat cycle system, the content of the refrigerant oil is within a range not to remarkably deteriorate the effects of the present invention and varies depending upon the purpose of application, the form of the compressor, etc., and is usually from 10 to 100 parts by mass, preferably from 20 to 50 parts by mass based on the working fluid for heat cycle (100 parts by mass).

(Stabilizer)

The stabilizer is a component which improves the stability of the working fluid for heat cycle against heat and oxidation. The stabilizer may, for example, be an oxidation resistance-improving agent, a heat resistance-improving agent or a metal deactivator.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). The oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzimidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of the stabilizer is not limited within a range not to remarkably decrease the effects of the present invention, and is preferably at most 5 mass %, more preferably at most 1 mass % in the composition for a heat cycle system (100 mass %).

(Leak Detecting Substance)

The leak detecting substance may, for example, be an ultraviolet fluorescent dye, an odor gas or an odor masking agent.

The ultraviolet fluorescent dye may be known ultraviolet fluorescent dyes, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes such as perfumes as disclosed in e.g. JP-A-2008-500437 and JP-A-2008-531836.

In a case where the leak detecting substance is used, a solubilizing agent which improves the solubility of the leak detecting substance in the working fluid for heat cycle may be used.

The solubilizing agent may be ones as disclosed in e.g. JP-A-2007-511645, JP-A-2008-500437 and JP-A-2008-531836.

The content of the leak detecting substance is within a range not to remarkably decrease the effects of the present invention, and is usually at most 2 mass %, preferably at most 0.5 mass % in the composition for a heat cycle system (100 mass %).

(Other Compound)

The composition for a heat cycle system of the present invention may contain a $C_{1-4}$ alcohol or a compound used as a conventional working fluid for heat cycle, refrigerant or heat transfer fluid (hereinafter the alcohol and the compound will generally be referred to as other compound).

As such other compound, the following compounds may be mentioned.

Fluorinated ether: Perfluoropropyl methyl ether ($C_3F_7OCH_3$), perfluorobutyl methyl ether ($C_4F_9OCH_3$), perfluorobutyl ethyl ether ($C_4F_9OC_2H_5$), 1,1,2,2-tetrafluoroethyl-2,2,2-trifluoroethyl ether ($CF_2HCF_2OCH_2CF_3$, manufactured by Asahi Glass Company, Limited, AE-3000), etc.

The content of such other compound is not limited within a range not to remarkably decrease the effects of the present invention, and is usually preferably at most 30 mass %, more preferably at most 20 mass %, particularly preferably at most 15 mass % in the composition for a heat cycle system (100 mass %).

ADVANTAGEOUS EFFECTS

The working fluid for heat cycle and the composition for a heat cycle system of the present invention, which contain HFO-1123 and HFC-32 in a predetermined proportion, have small temperature glide, have a low discharge temperature and have self-decom position property suppressed, and are thereby excellent in durability and have less influence over global warming. Further, a heat cycle system excellent in the cycle performance can be obtained with them.

[Heat Cycle System]

The heat cycle system of the present invention is a system employing the working fluid for heat cycle of the present invention. When the working fluid for heat cycle of the present invention is applied to a heat cycle system, usually the working fluid for heat cycle is applied as contained in the composition for a heat cycle system.

The heat cycle system may, for example, be a refrigerating apparatus, an air-conditioning apparatus, a power generation system, a heat transfer apparatus and a secondary cooling machine. The heat cycle system may, for example, be specifically a room air-conditioner, a store package air-conditioner, a building package air-conditioner, a plant package air-condition, a gas engine heat pump, a train air-conditioning system, an automobile air-conditioning system, a built-in showcase, a separate showcase, an industrial fridge freezer, a vending machine or an ice making machine.

(Moisture Concentration)

A problem such that moisture is included in the heat cycle system may occur. Inclusion of moisture may occur due to freezing in a capillary tube, hydrolysis of the working fluid for heat cycle or the refrigerant oil, deterioration of materials by an acid component formed in the heat cycle, formation of contaminants, etc. Particularly, the above-described polyalkylene glycol oil or polyol ester oil has extremely high moisture absorbing properties and is likely to undergo hydrolysis, and inclusion of moisture decreases properties of the refrigerant oil and may be a great cause to impair the long term reliability of a compressor. Further, in an automobile air-conditioning system, moisture tends to be included from a refrigerant hose used for the purpose of absorbing vibration or a bearing of a compressor. Accordingly, in order to suppress hydrolysis of the refrigerant oil, it is necessary to control the moisture concentration in the heat cycle system. The moisture concentration in the heat cycle system is preferably less than 10,000 ppm, more preferably less than 1,000 ppm, particularly preferably less than 100 ppm by the mass ratio based on the working fluid for heat cycle.

As a method of controlling the moisture concentration in the heat cycle system, a method of using a desiccating agent (such as silica gel, activated aluminum or zeolite) may be mentioned. The desiccating agent is preferably a zeolite desiccating agent in view of chemical reactivity of the desiccating agent and the working fluid for heat cycle, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are particularly important.

In a case where a desiccating agent having a pore size larger than the molecular size of the working fluid for heat cycle is used, the working fluid for heat cycle is adsorbed in the desiccating agent and as a result, chemical reaction between the working fluid for heat cycle and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid for heat cycle, it is possible to selectively adsorb and remove only moisture in the heat cycle system without adsorbing the working fluid for heat cycle. In other words, the working fluid for heat cycle is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The amount of the zeolite desiccating agent based on the working fluid for heat cycle is not particularly limited.
(Oxygen Concentration)

Oxygen may be included in the heat cycle system. Since inclusion of oxygen may cause deterioration of the working fluid for heat cycle or the like, it is necessary to keep the oxygen concentration in the heat cycle system low. The oxygen concentration in the heat cycle system is preferably less than 10,000 ppm, more preferably less than 1,000 ppm, particularly preferably less than 100 ppm by the mass ratio based on the working fluid for heat cycle.
(Chlorine Concentration)

If chlorine is present in the heat cycle system, it may have undesirable effects such as formation of a deposit by a reaction with a metal, friction of a bearing, and decomposition of the working fluid for heat cycle or the refrigerant oil.

The chlorine concentration in the heat cycle system is preferably at most 100 ppm, particularly preferably at most 50 ppm by the mass ratio based on the working fluid for heat cycle.
(Non-Condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid for heat cycle or the refrigerant oil and promotes their decomposition.

The non-condensing gas concentration is preferably at most 1.5 vol %, particularly preferably at most 0.5 vol % by the volume ratio based on the working fluid for heat cycle, in a gaseous phase of the working fluid for heat cycle.
Advantageous Effects The above-described heat cycle system, which employs the working fluid for heat cycle of the present invention, has high durability, has less influence over the ozone layer, and is excellent in the cycle performance (capacity) and the energy efficiency. Further, the system can be downsized due to excellent capacity.

EXAMPLES

Now, the present invention will be described in further detail with reference to Examples. However, it should be understood that the present invention is by no means restricted to such specific Examples.

Ex. 1

(Evaluation of Self-Decomposition Property)

With respect to a working fluid for heat cycle comprising HFO-1123 and HFC-32, self-decomposition property was evaluated under pressure conditions up to 7.0 MPa. The self-decomposition property was evaluated in equipment in accordance with method A recommended as equipment for measurement of the combustion range of a gas mixture containing halogen, by individual notifications in High Pressure Gas Safety Act.

A working fluid for heat cycle having HFO-1123 and HFC-32 mixed in a proportion as identified in Table 1 was enclosed in a spherical pressure resistant reactor having an internal capacity of 650 cm³ and having a temperature in the interior controlled to a range of from 190° C. to 210° C. by heating by a heater from the outside, to a pressure as identified in Table 1. Then, a platinum wire (outer diameter: 0.5 mm, length: 25 mm) placed in the inside of the spherical pressure resistant reactor was fused under a voltage of 10 V at an electric current of 50 A (hot wire method). Temperature and pressure changes in the pressure resistant container after fusing were measured. Further, the gas composition after the test was analyzed. In a case where a pressure increase and a temperature increase in the spherical pressure resistant reactor were confirmed after the test and a large amount of a self-decomposition reaction product ($CF_4$, HF, coke) in an amount of at least 20 mol % per 100 mol % of HFO-1123 charged was detected by the gas analysis after the test, such a case was evaluated that self-decom position reaction occurred. The results are shown in Table 1 together with the pressure conditions and the compositions of the working fluids for heat cycle. The pressure in Table 1 is the gauge pressure.

TABLE 1

| Composition of working fluid for heat cycle [mass %] | | | Self-decomposition |
|---|---|---|---|
| HFO-1123 | HFC-32 | Pressure [MPa] | reaction |
| 79 | 21 | 2.00 | Occurred |
| 72 | 28 | 2.00 | Nil |
|  |  | 4.50 | Occurred |
| 67 | 33 | 2.00 | Nil |
|  |  | 2.50 | Nil |
|  |  | 4.50 | Occurred |
| 60 | 40 | 2.00 | Nil |
|  |  | 3.00 | Nil |
|  |  | 4.00 | Nil |
|  |  | 4.50 | Occurred |
|  |  | 6.00 | Occurred |

TABLE 1-continued

| Composition of working fluid for heat cycle [mass %] | | | Self-decomposition |
|---|---|---|---|
| HFO-1123 | HFC-32 | Pressure [MPa] | reaction |
| 55 | 45 | 6.00 | Nil |
|  |  | 6.34 | Nil |
|  |  | 7.00 | Nil |

It was confirmed from Table 1 that a working fluid for heat cycle comprising HFO-1123 and HFC-32 in a mass ratio of HFO-1123 to HFC-32 in the working fluid for heat cycle (hereinafter referred to as HFO-1123/HFC-32) of less than 60/40 has no self-decomposition property even under a pressure of at least 5.0 MPa, and had no self-decom position property even under 7.0 MPa.

Ex. 2

(Evaluation of Discharge Temperature, GWP and Temperature Glide)

With respect to a working fluid for heat cycle having a composition as identified in Table 2, the discharge temperature T was determined, and ΔT was calculated by the above-described method. Further, the global warming potential (GWP) was calculated. The results are shown in Table 2. Further, the temperature glide under the condition under which the discharge temperature was obtained is also shown in Table 2. Further, with respect to the self-decomposition property, a composition range with no self-decomposition property was indicated by a solid arrow and a range with self-decom position property was indicated by a dotted arrow in Table 2.

TABLE 2

| Composition of working fluid for heat cycle [mass %] | | Difference with $T_{R410A}$ (ΔT) | GWP | Temperature glide | Self-decomposition property under 5.0 MPa |
|---|---|---|---|---|---|
| HFO-1123 | HFO-32 | | | | |
| 100 | 0 | 2.09 | 0 | 0.00 | With self-decomposition property |
| 90 | 10 | 4.02 | 68 | 0.00 | |
| 80 | 20 | 5.97 | 135 | 0.01 | |
| 70 | 30 | 8.04 | 203 | 0.06 | |
| 60 | 40 | 10.21 | 270 | 0.17 | |
| 59 | 41 | 10.43 | 277 | 0.18 | Nil |
| 58 | 42 | 10.66 | 284 | 0.20 | |
| 57 | 43 | 10.88 | 290 | 0.21 | |
| 56 | 44 | 11.10 | 297 | 0.23 | |
| 55 | 45 | 11.33 | 304 | 0.24 | |
| 54 | 46 | 11.55 | 311 | 0.25 | |
| 53 | 47 | 11.78 | 317 | 0.27 | |
| 52 | 48 | 12.00 | 324 | 0.28 | |
| 51 | 49 | 12.23 | 331 | 0.30 | |
| 50 | 50 | 12.46 | 338 | 0.31 | |
| 49 | 51 | 12.68 | 344 | 0.33 | |
| 48 | 52 | 12.91 | 351 | 0.34 | |
| 47 | 53 | 13.14 | 358 | 0.36 | |
| 46 | 54 | 13.36 | 365 | 0.37 | |
| 45 | 55 | 13.59 | 371 | 0.38 | |
| 44 | 56 | 13.81 | 378 | 0.40 | |
| 43 | 57 | 14.04 | 385 | 0.41 | |
| 42 | 58 | 14.27 | 392 | 0.42 | |
| 41 | 59 | 14.49 | 398 | 0.43 | |
| 40 | 60 | 14.72 | 405 | 0.45 | |
| 30 | 70 | 16.93 | 473 | 0.52 | |
| 20 | 80 | 19.06 | 540 | 0.50 | |
| 10 | 90 | 21.08 | 608 | 0.33 | |
| 0 | 100 | 22.96 | 675 | 0.00 | |

It was confirmed from the results in Table 2 that the working fluid for heat cycle of the present invention has low GWP and small temperature glide, and has no self-decomposition property. Further, it was confirmed to have ΔT of at most 15° C. and have a low discharge temperature T.

Ex. 3

(Evaluation of Refrigerating Cycle Performance)

The refrigerating cycle performance (refrigerating capacity and coefficient of performance) was evaluated as the cycle performance (capacity and efficiency) in a case where a working fluid for heat cycle comprising HFO-1123 and HFC-32 in a proportion as identified in Table 3 was applied to a refrigerating cycle system 10 shown in FIG. 1, and a heat cycle as shown in FIG. 2, that is, adiabatic compression by a compressor 11 in the AB process, isobaric cooling by a condenser 12 in the BC process, isenthalpic expansion by an expansion valve 13 in the CD process, isobaric heating in an evaporator 14 in the DA process, were carried out.

The evaluation was conducted under temperature conditions which were the same as those when the discharge temperature T was obtained. That is, the heat cycle was conducted under the temperature conditions such that the average evaporation temperature of the working fluid for heat cycle in the evaporator 14 was 0° C., the average condensing temperature of the working fluid for heat cycle in the condenser 12 was 40° C., the supercooling degree of the working fluid for heat cycle in the condenser 12 was 5° C., and the degree of superheat of the working fluid for heat cycle in the evaporator 14 was 5° C. Further, it was assumed that there was no loss in the equipment efficiency and no pressure loss in the pipelines and heat exchanger.

The refrigerating capacity and the coefficient of performance were obtained in accordance with the above formulae (1) and (2) from enthalpies h in the respective states of the working fluid for heat cycle, i.e. A (after evaporation, high temperature and low pressure), B (after compression, high temperature and high pressure), C (after condensation, low temperature and high pressure) and D (after expansion, low temperature and low pressure).

The thermodynamic properties required for calculation of the refrigerating cycle performance were calculated based on the generalized equation of state (Soave-Redlich-Kwong equation) based on the law of corresponding state and various thermodynamic equations. If a characteristic value was not available, it was calculated employing an estimation technique based on a group contribution method.

The relative performance (working fluid for heat cycle/ R410A) of the refrigerating cycle performance (refrigerating capacity and coefficient of performance) of each working fluid for heat cycle based on R410A, was obtained based on the refrigerating cycle performance of R410A. The results are shown in Table 3.

TABLE 3

| HFO-1123 Mass % | HFC-32 Mass % | Relative performance (based on R410A) | |
|---|---|---|---|
| | | Coefficient of performance | Refrigerating capacity |
| 100 | 0 | 0.92 | 1.15 |
| 60 | 40 | 0.95 | 1.20 |
| 59 | 41 | 0.95 | 1.20 |
| 58 | 42 | 0.95 | 1.20 |
| 57 | 43 | 0.96 | 1.20 |

TABLE 3-continued

| HFO-1123 Mass % | HFC-32 Mass % | Relative performance (based on R410A) | |
|---|---|---|---|
| | | Coefficient of performance | Refrigerating capacity |
| 56 | 44 | 0.96 | 1.20 |
| 55 | 45 | 0.96 | 1.20 |
| 54 | 46 | 0.96 | 1.20 |
| 53 | 47 | 0.96 | 1.19 |
| 52 | 48 | 0.96 | 1.19 |
| 51 | 49 | 0.96 | 1.19 |
| 50 | 50 | 0.96 | 1.19 |
| 49 | 51 | 0.96 | 1.19 |
| 48 | 52 | 0.96 | 1.19 |
| 47 | 53 | 0.97 | 1.19 |
| 46 | 54 | 0.97 | 1.19 |
| 45 | 55 | 0.97 | 1.19 |
| 44 | 56 | 0.97 | 1.19 |
| 43 | 57 | 0.97 | 1.19 |
| 42 | 58 | 0.97 | 1.18 |
| 41 | 59 | 0.97 | 1.18 |
| 40 | 60 | 0.97 | 1.18 |
| 0 | 100 | 1.01 | 1.11 |

It was found from the results in Table 3 that the working fluid for heat cycle of the present invention had a coefficient of performance and a refrigerating capacity equal to or higher than those of R410A. Further, it was confirmed that both the coefficient of performance and the refrigerating capacity improved by the working fluid containing HFO-1123 and HFC-32 as compared with a working fluid containing only HFO-1123.

INDUSTRIAL APPLICABILITY

The working fluid for heat cycle of the present invention is useful as a working fluid such as a refrigerant for a refrigerator, a refrigerant for an air-conditioning apparatus, a working fluid for power generation system (such as exhaust heat recovery powder generation), a working fluid for a latent heat transport apparatus (such as a heat pipe) or a secondary cooling fluid.

REFERENCE SYMBOLS

10: refrigerating cycle system, 11: compressor, 12: condenser, 13: expansion valve, 14: evaporator, 15, 16: pump, A, B: vapor of working fluid for heat cycle, C, D: working fluid for heat cycle, E, E': load fluid, F: fluid.

What is claimed is:

1. A working fluid for heat cycle, the working fluid comprising trifluoroethylene and difluoromethane, wherein the proportion of the total amount of trifluoroethylene and difluoromethane based on the entire amount of the working fluid for heat cycle is higher than 90 mass % and at most 100 mass %, and
   the mass ratio represented by trifluoroethylene/difluoromethane in the working fluid for heat cycle-is from 45/55 to 59/41.

2. The working fluid for heat cycle according to claim 1, wherein the mass ratio represented by trifluoroethylene/difluoromethane in the working fluid for heat cycle is from 45/55 to 55/45.

3. The working fluid for heat cycle according to claim 1, wherein the proportion of the total amount of trifluoroethylene and difluoromethane based on the entire amount of the working fluid for heat cycle is higher than 97 mass % and at most 100 mass %.

4. The composition for a heat cycle system, comprising the working fluid for heat cycle as defined in claim 1 and a refrigerant oil.

5. A heat cycle system, comprising the composition for a heat cycle system as defined in claim 4.

6. The heat cycle system according to claim 5, wherein the heat cycle system is a refrigerating apparatus, an air-conditioning apparatus, a power generation system, a heat transport apparatus or a secondary cooling machine.

7. The heat cycle system according to claim 5, wherein the heat cycle system is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

8. The working fluid for heat cycle according to claim 1, wherein the working fluid has no self-decomposition property under a pressure of 5.0 MPa.

9. The working fluid for heat cycle according to claim 1, wherein the working fluid has no self-decomposition property under a pressure of 7.0 MPa.

10. The working fluid for heat cycle according to claim 1, wherein the working fluid has a global warming potential (100 years) in Intergovernmental Panel on Climate Change, Fourth assessment report (2007) of at most 371.

\* \* \* \* \*